No. 881,080. PATENTED MAR. 3, 1908.
F. KLOUSNITZER.
AGRICULTURAL IMPLEMENT.
APPLICATION FILED JUNE 7, 1907.
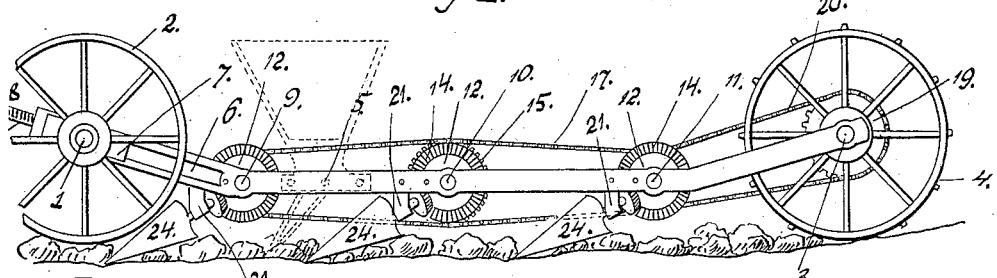
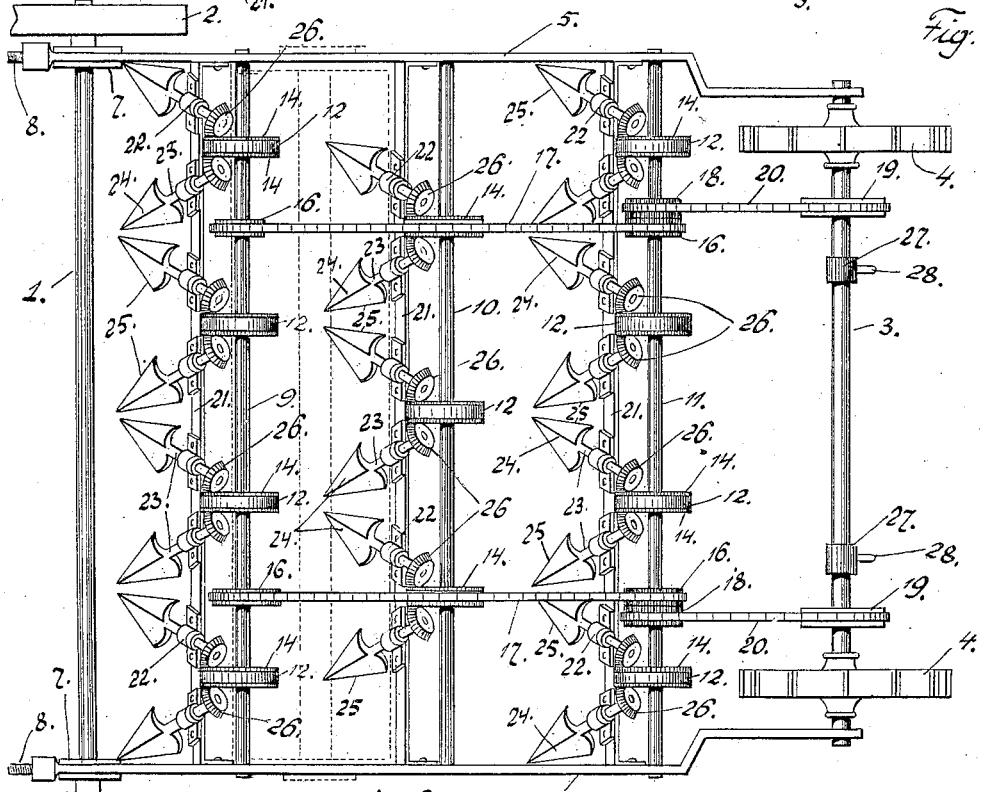
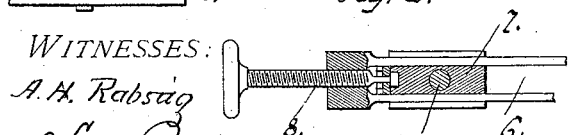
WITNESSES:
A. H. Rabsag
INVENTOR
Frank Klousnitzer,
BY
Attorneys

UNITED STATES PATENT OFFICE.

FRANK KLOUSNITZER, OF HERMAN, PENNSYLVANIA.

AGRICULTURAL IMPLEMENT.

No. 881,080.  Specification of Letters Patent.  Patented March 3, 1908.

Application filed June 7, 1907. Serial No. 377,676.

*To all whom it may concern:*

Be it known that I, FRANK KLOUSNITZER, a subject of the Emperor of Austria-Hungary, residing at Herman, in the county of Butler and State of Pennsylvania, have invented certain new and useful Improvements in Agricultural Implements, of which the following is a specification, reference being had therein to the accompanying drawing.

This invention relates to improvements in agricultural implements of that type commonly styled harrows.

The invention has for its object to provide a harrow having a plurality of angularly disposed agitating blades or cutters, adapted to disintegrate the soil over which the implement is moved.

My invention aims to provide a strong and durable implement wherein positive and reliable means are employed for effecting a rotation of a plurality of agitating blades or cutters advantageously arranged in the frame work of the harrow, the blades or cutters being disposed to thoroughly disintegrate clogs of earth on partially prepared soil.

Detailed construction of my improved harrow will be hereinafter more fully described and then specifically pointed out in the appended claims.

Referring to the drawing forming part of this specification, Figure 1 is an elevation of a harrow constructed in accordance with my invention. Fig. 2 is a plan of the same, and Fig. 3 is a detailed sectional view of a portion of the harrow.

To put my invention into practice, I construct the harrow of a rear axle 1 for wheels 2 journaled thereon, a front axle 3 having tread wheels 4 mounted thereon. The axle 3 is of a less length than the axle 1 and is journaled in the forward ends of side frames 5, said side frames having their rear ends bifurcated, as at 6, and adjustably connected to the axle 1 by bearing blocks 7 and screws 8.

Journaled in the side frames 5 are transverse shafts 9, 10 and 11, said shafts being provided with a plurality of fixed wheels 12, having beveled teeth 14 upon their sides. Two of the beveled gear wheels upon the shaft 10 have sprocket teeth 15 and serve functionally as sprocket wheels. The shafts 9 and 11 are provided with sprocket wheels 16, sprocket chains 17 passing over said wheels and the wheels 15. The shaft 11 is also provided with sprocket wheels 18, while the axle 3 is provided with sprocket wheels 19. Over the wheels 18 and 19 pass sprocket chains 20. From the novel manner in which the shafts 9 and 11 inclusive are geared together, it will be observed that when the implement is drawn over the soil, a rotary movement will be imparted to the beveled gear wheels 12 through the medium of the sprocket wheels, chains and forward axle.

Supported by the side frames 5, contiguous to each of the shafts 9, 10 and 11, is a bar 21, said bar being arranged transversely of the machine and disposed at a slight angle. Fixed upon each bar are bearings 22 for the shanks 23 of blades or cutters 24, said blades or cutters being spear shaped and having curved cutting edges 25. The upper ends of the shanks 23 of said blades or cutters are provided with beveled gear wheels 26 meshing with the beveled teeth 14 of the wheels 12. The blades or cutters are disposed at an angle upon the bars 21 and are preferably arranged in sets; that is, two blades or cutters being driven by each of the wheels 12. In consequence of this arrangement I found it necessary to alternate the blades or cutters adjacent to the shaft 10 with relation to the blades or cutters adjacent to the shafts 9 and 11, whereby, when the implement is drawn over the soil, the entire surface of soil beneath the implement will be agitated and disintegrated.

Upon the forward axle 3 are loosely mounted sleeves 27 having eyelets 28, whereby chains or a draft-gear (not shown) can be connected to the implement, to permit of its movement over the soil by a team of horses or a traction engine. In connection with my improved implement, I can use a grain planter, as I have illustrated in dotted line. The entire implement is constructed of strong and durable metal capable of withstanding the rough usage to which the same is subjected, especially upon a stony and indurate soil. In adjustably mounting the rear ends of the frames of the harrow, I can easily and quickly raise or lower the blades or cutters, with relation to the soil over which the implement passes. It is thought that the operation of my improved harrow will be apparent to those skilled in the art of farm implements, and while I have herein described the preferred arrangement of the blades and cutters, I desire to be understood that such changes in the minor details of construction, as are permissible by the appended claims, can be resorted to without departing from the scope of the invention.

Having fully described my invention, what I claim and desire to secure by Letters Patent is:

1. A harrow consisting of side frames, a rear axle adjustably mounted in said frames, a forward axle journaled in said frames, wheels supporting said axles, a plurality of shafts journaled in said frames, double beveled gear wheels mounted upon said shafts, sprocket wheels mounted upon said forward axle, sprocket chains passing over said sprocket wheels, bars arranged between said frames, angularly disposed blades journaled upon said bars, beveled gear wheels carried by said blades and meshing with said double beveled gear wheels, the blades of said bars being staggeredly arranged.

2. An implement of the type described consisting of movable side frames, shafts journaled in said frames, sprocket wheels mounted upon said shafts, sprocket chains passing over said wheels, bars arranged between said frames, sets of blades disposed at an angle upon said bars, means actuated by the movement of said frames for rotating said shafts, and means carried by said shafts for imparting a rotary movement to said blades.

3. A harrow embodying movable frames, bars arranged between said frames, a plurality of blades disposed at an angle upon said frames, means carried by said frames and actuated by the movement of said harrow for imparting a rotary movement to said blades, said means including beveled gear wheels, sprocket wheels and chains.

In testimony whereof I affix my signature in the presence of two witnesses.

FRANK KLOUSNITZER.

Witnesses:
   MAX H. SROLOVITZ,
   C. V. BROOK.